(12) United States Patent
Craig et al.

(10) Patent No.: US 10,581,050 B2
(45) Date of Patent: Mar. 3, 2020

(54) BATTERY HAVING A LOW COUNTER-ION PERMEABILITY LAYER

(71) Applicant: Robert Bosch GmbH, Stuttgart (DE)

(72) Inventors: Nathan P. Craig, Burlingame, CA (US); John F. Christensen, Elk Grove, CA (US); Hany Eitouni, Oakland, CA (US); Katherine Harry, Oakland, CA (US); Abdul-Kader Srouji, San Francisco, CA (US)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 16/002,089

(22) Filed: Jun. 7, 2018

(65) Prior Publication Data

US 2018/0358598 A1 Dec. 13, 2018

Related U.S. Application Data (60) Provisional application No. 62/516,259, filed on Jun. 7, 2017.

(51) Int. Cl.
*H01M 4/02* (2006.01)
*H01M 2/16* (2006.01)
*H01M 10/0525* (2010.01)

(52) U.S. Cl.
CPC ....... *H01M 2/1686* (2013.01); *H01M 2/1646* (2013.01); *H01M 2/1653* (2013.01); *H01M 2/1673* (2013.01); *H01M 10/0525* (2013.01)

(58) Field of Classification Search
CPC .................................................... H01M 4/02
See application file for complete search history.

(56) References Cited

U.S. PATENT DOCUMENTS 7,211,351 B2  5/2007  Klaassen
7,776,478 B2  8/2010  Klaassen
(Continued)

FOREIGN PATENT DOCUMENTS

JP   2002110243 A   4/2002
JP   2009043737 A   2/2009
(Continued)

OTHER PUBLICATIONS

Bai, P. et al. Transition of lithium growth mechanisms in liquid electrolytes, Energy & Environmental Science, 2016, vol. 9, pp. 3221-3229, Sep. 1, 2016. Royal Society of Chemistry.
(Continued)

*Primary Examiner* — Jacob B Marks
(74) *Attorney, Agent, or Firm* — Maginot, Moore & Beck LLP (57) ABSTRACT

An electrode configuration for a battery cell includes a positive electrode, a negative electrode, a separator interposed between the positive electrode and the negative electrode, and a low counter-ion permeability layer interposed between the separator and the positive electrode. The separator has a first permeability to counter-ions, which do not participate in the battery electrode reactions, and the low counter-ion permeability layer has a second permeability to the counter-ions that is less than the first permeability. The separator includes a first salt concentration adjacent to the low counter-ion permeability layer and a second salt concentration adjacent to the negative electrode, and the second salt concentration is greater than the first salt concentration.

18 Claims, 3 Drawing Sheets

(56) References Cited

U.S. PATENT DOCUMENTS

| | | |
|---|---|---|
| 8,268,197 B2 | 9/2012 | Singh et al. |
| 8,563,168 B2 | 10/2013 | Balsara et al. |
| 8,889,301 B2 | 11/2014 | Balsara et al. |
| 8,927,152 B2 | 1/2015 | Chung et al. |
| 9,136,562 B2 | 9/2015 | Singh et al. |
| 2004/0029014 A1 | 2/2004 | Hwang et al. |
| 2009/0061288 A1 | 3/2009 | Gordon et al. |
| 2011/0311882 A1 | 12/2011 | Kim et al. |
| 2012/0141881 A1 | 6/2012 | Geier et al. |
| 2013/0065134 A1 | 3/2013 | Ogawa et al. |
| 2014/0272569 A1 | 9/2014 | Cai et al. |
| 2016/0118695 A1 | 4/2016 | Lee et al. |
| 2017/0005373 A1* | 1/2017 | Tashiro ............... H01M 10/484 |

FOREIGN PATENT DOCUMENTS

| | | |
|---|---|---|
| JP | 2010262860 A | 11/2010 |
| KR | 1020160150555 A | 12/2016 |

OTHER PUBLICATIONS

International Search Report and Written Opinion corresponding to International Patent Application No. PCT/US2018/036453 (11 pages).

* cited by examiner

BATTERY HAVING A LOW COUNTER-ION PERMEABILITY LAYER

CLAIM OF PRIORITY

This application claims priority to U.S. Provisional Application Ser. No. 62/516,259 entitled "Battery Having a Lower Counter-Ion Permeability Layer" filed Jun. 7, 2017, the disclosure of which is incorporated herein by reference in its entirety.

TECHNICAL FIELD

This disclosure relates generally to batteries, and more particularly to electrode configurations for batteries.

BACKGROUND

In batteries, ions transfer between the negative electrode and positive electrode during charge and discharge cycles. For instance, when discharging, electrons flow from the negative electrode, through an external circuit, to the positive electrode to generate an electrical current in the external circuit. During this process, positive ions, for example lithium ions in a lithium-ion battery, travel within the battery from the negative electrode, through an electrolyte, to the positive electrode. Conversely, when charging, the external circuit supplies current that reverses the flow of electrons from the positive electrode, through the external charging circuit, and back to the negative electrode, while the positive ions move within the battery from the positive electrode through the electrolyte to the negative electrode.

Two important measures by which the performance of batteries are determined are the energy density of the battery, or the ratio of the energy stored to the volume or size of the battery, and the rate at which the battery can be charged or discharged. In conventional batteries, there is a tradeoff between the energy density of the battery, and the rate at which the battery can be charged or discharged. For a given set of battery materials, the energy and charge/discharge rate can be modified by, for example, changing the quantity of active material in the electrodes. The amount of active material in the electrodes can be increased by either decreasing the pore space occupied by the electrolyte, or increasing the thickness of the electrode. Either of these modifications, however, leads to a decrease in the rate at which the cell can be charged or discharged.

One particular limiting factor to the charge and discharge speed of a battery is known as concentration polarization. As noted above, during charging and discharging, the ions in the electrolyte adjacent to the positive electrode and negative electrode, respectively, travel from the electrodes through the electrolyte and to the other of the negative electrode and positive electrode, respectively. The counter-ions, or the ions that do not participate in the reactions at the negative electrode and positive electrode, tend to migrate in the direction opposite of the direction the active ions are moving. During charging, the ion travel can result in ion accumulation at the positive electrode and ion depletion at the negative electrode. Conversely, during discharge, the ion travel results in ion accumulation at the negative electrode and ion depletion at the positive electrode. This ion accumulation and depletion is known as concentration polarization.

The concentration polarization in the electrolyte immediately adjacent to the positive electrode or negative electrode reduces the speed at which the battery can be charged and discharged since there are a reduced number of active ions that can participate in the electrochemical reactions adjacent to the respective electrode. Furthermore, in some instances the active ions adjacent to the positive electrode and/or negative electrode can be depleted to the extent that undesirable reactions occur in the battery, causing damage to the battery.

Some conventional batteries attempt to reduce concentration polarization by increasing the mobility of the reactive ions in the battery. However, increasing the mobility of the reactive ions requires redesign of the electrolyte in the battery, which can involve a host of further considerations, can increase the cost of the battery, and can reduce the efficiency of the battery in other ways.

What is needed therefore is an alternative way of reducing the concentration polarization of a battery to improve the efficiency and performance of the battery.

SUMMARY

In one embodiment, an electrode configuration for a battery cell includes a positive electrode, a negative electrode, a separator interposed between the positive electrode and the negative electrode, and a low counter-ion permeability layer interposed between the separator and the positive electrode. The separator has a first permeability to counter-ions, which do not participate in the battery electrode reactions, and the low counter-ion permeability layer has a second permeability to the counter-ions that is less than the first permeability. The separator includes a first salt concentration adjacent to the low counter-ion permeability layer and a second salt concentration adjacent to the negative electrode, and the second salt concentration is greater than the first salt concentration.

In some embodiments, the low counter-ion permeability layer includes a film applied to the positive electrode. In further embodiments, the film includes one or more of: LATP; LLZO; LLTO; an ion-exchange polymer; sulfonated tetrafluoroethylene; a mixed conductor; and $TiS_2$.

In another embodiment of the electrode configuration, the low counter-ion permeability layer includes LATP embedded in an inert, nonconductive polymer in such a way that the low counter-ion permeability layer forms a percolating network of the lithium conducting material between the separator and the positive electrode.

In some embodiments of the electrode configuration, the low counter-ion permeability layer is formed of LiPON deposited on the positive electrode.

In another embodiment, the counter-ions include first counter-ions adjacent to the positive electrode and second counter-ions adjacent to the negative electrode, and the first counter-ions are different from the second counter-ions. In one particular embodiment, the first counter-ions are provided by $LiBF_4$ and the second counter-ions are provided by LiTFSI.

In some embodiments, the positive electrode comprises a first solvent, and the separator comprises a second solvent, the first solvent being different from the second solvent. The low counter-ion permeability layer has low permeability to the first and second solvents such that the first and second solvents are separated by the low counter-ion permeability layer.

In a further embodiment, the first solvent includes acetonitrile and the second solvent includes polyethylene oxide. The positive electrode further comprises a positive electrode active material including NCA.

In some embodiments, the electrode configuration further comprises a vinylene carbonate additive adjacent to the negative electrode.

In one embodiment, the low counter-ion permeability layer includes a plurality of particles or flakes embedded in a material that is the same as material from which one of the separator and the positive electrode is formed.

In some embodiments of the electrode configuration, the low counter-ion permeability layer has a thickness of less than 500 microns.

In a further embodiment, the separator is formed of polyethylene oxide with a salt or with a solid polymer electrolyte.

In another embodiment, the positive electrode includes a first solid ionically conductive material and the negative electrolyte includes a second solid ionically conductive material.

In one embodiment according to the disclosure, a battery cell comprises an electrode configuration that includes a positive electrode, a negative electrode, a separator interposed between the positive electrode and the negative electrode, and a low counter-ion permeability layer interposed between the separator and the positive electrode. The separator has a first permeability to counter-ions, which do not participate in the battery electrode reactions, and the low counter-ion permeability layer has a second permeability to the counter-ions that is less than the first permeability. The separator includes a first salt concentration adjacent to the low counter-ion permeability layer and a second salt concentration adjacent to the negative electrode, and the second salt concentration is greater than the first salt concentration.

In a further embodiment, an electrode configuration for a battery cell includes a positive electrode, a negative electrode, a separator interposed between the positive electrode and the negative electrode, and a low counter-ion permeability layer interposed between the separator and the positive electrode. The separator has a first permeability to counter-ions, which do not participate in the battery electrode reactions, and the low counter-ion permeability layer has a second permeability to the counter-ions that is less than the first permeability. The counter-ions include first counter-ions adjacent to the positive electrode and second counter-ions adjacent to the negative electrode, the first counter-ions being different from the second counter-ions.

In one embodiment, the first counter-ions are provided by $LiBF_4$ and the second counter-ions are provided by LiTFSI. In some embodiments, a first concentration of the $LiBF_4$ adjacent to the positive electrode is less than a second concentration of the LiTFSI adjacent to the negative electrode.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous.

The embodiments of the disclosure discussed below are applicable to any desired battery chemistry. Some examples refer to lithium-ion batteries for illustrative purposes. As used herein, the term "lithium-ion battery" refers to any battery which includes lithium as an active material. In particular, lithium-ion batteries include, without limitation, lithium having liquid electrolytes, solid electrolytes, and batteries commonly referred to as lithium-polymer batteries or lithium-ion-polymer batteries.

Figure 1:
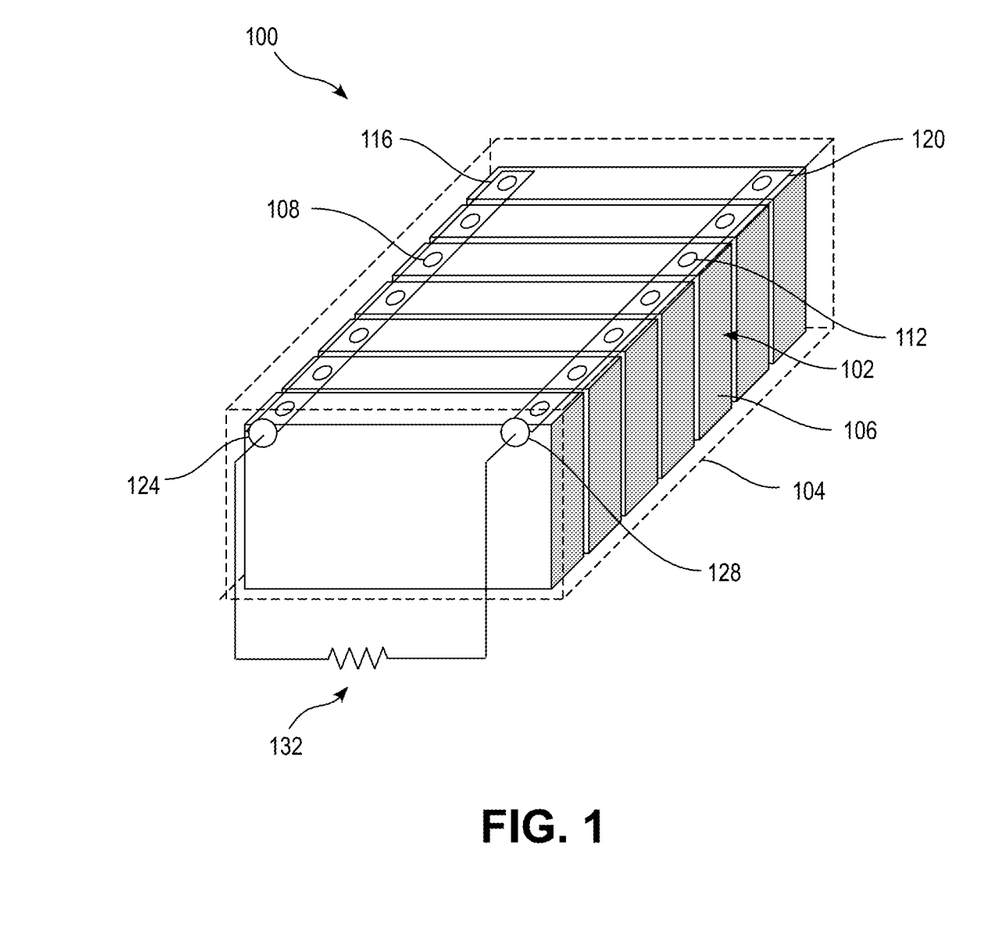
FIG. 1 is a schematic view of a battery pack according to the disclosure.

Referring now to FIG. 1, a battery pack 100 includes a plurality of battery cells 102 arranged in a pack housing 104. Each of the battery cells 102 includes a cell housing 106, from which a positive terminal 108 and a negative terminal 112 are exposed. In a parallel arrangement, the positive terminals 108 may be connected to one another by a current collector 116, and the negative terminals 112 may be connected to one another by a different current collector 120. In a series arrangement, the positive terminals 108 may be connected to adjacent negative terminals 112 by a current collector. The current collectors 116, 120 are connected to respective positive and negative battery pack terminals 124, 128, which connect to an external circuit 132 that may be powered by the battery pack 100, or may be configured to charge the battery pack 100.

Figure 2:
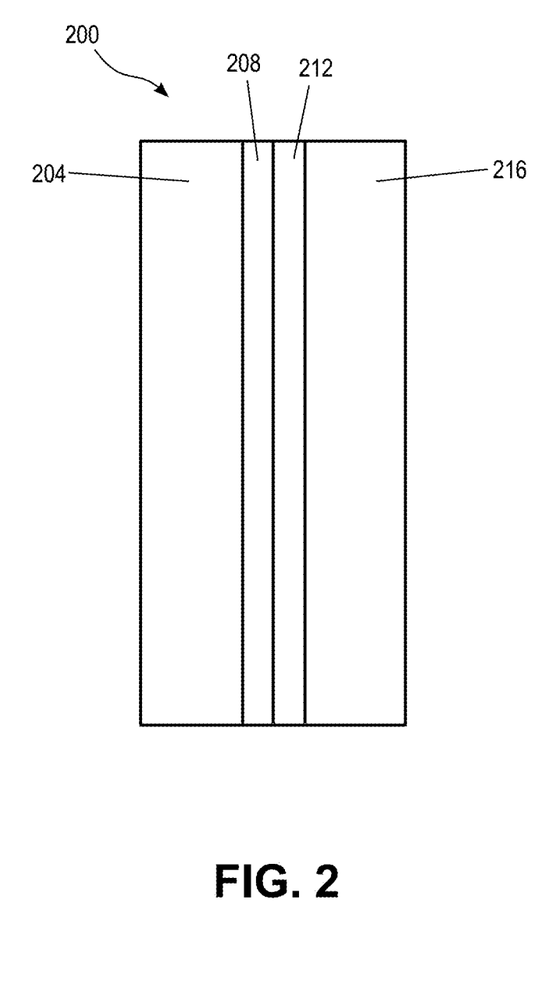
FIG. 2 is a schematic view of a battery cell of the battery pack of FIG. 1.

As depicted in FIG. 2, each battery cell 102 includes an electrode configuration 200, each of which includes a positive electrode 204, a low counter-ion permeability layer 208, a separator layer 212, and a negative electrode 216. In some embodiments, multiple layers of the electrode configuration 200 are stacked on top of one another so as to form an electrode stack. In other embodiments, the electrode configuration 200 is wound around itself in a spiral shape so as to form what is known as a "jelly-roll" or "Swiss-roll" configuration.

In one embodiment, the electrode configuration 200 is formed beginning with the positive electrode 204. The positive electrode 204 may be coated using conventional battery coating techniques. The positive electrode may have a thickness of 1 to 500 microns and contain active material, electrically conductive material, and, in some embodiments, a binder material that binds the various materials together. In various embodiments, the active material may include one or more of NCM (nickel-cobalt-manganese oxide), $FePO_4$ (iron (III) phosphate) $LiCoO_2$ (lithium cobalt oxide), NCA (nickel-cobalt-aluminum oxide), $FeF_3$, $FeS_2$, vanadium oxide, sulfur, oxygen, or any other suitable positive electrode active material. The electrically conductive material may include one or more of carbon black, metal particles, or another suitable electrically conductive material. The binder material may be, for example, polyvinylidene fluoride ("PVDF").

The positive electrode 204 further includes an ionically conductive material, which may be present on the positive electrode 204 when the battery is assembled, or which may be added in a subsequent step. For example, in embodiments having a solid ionically conductive material, the ionically conductive material may be present in the positive electrode before assembly of the battery. In some embodiments, the solid ionically conductive material is a polymer with salt, for example polyethylene oxide with salt. In embodiments having a liquid ionically conductive material, the ionically conductive material may be added in a subsequent step. The liquid ionically conductive material may be, for example, a mixture of carbonates with salt.

The low counter-ion permeability layer 208 may have various compositions, including one or more of a ceramic, a glass, and a polymer. The layer must have a greater permeability of the active ions than of the passive ions. In some embodiments, the layer 208 is electrically conductive, while in other embodiments the layer 208 is not electrically conductive. The layer 208 with low counter-ion permeability may be applied to the positive electrode 204 as a thin film or the layer 208 may be deposited on the positive electrode 204. In embodiments having a film applied to the positive electrode 204, the material for the film may include one or more of LATP (lithium-aluminum-titanium-phosphate), LLZO (lithium-lanthanum-zirconium-oxide or lithium-lanthanum-zirconate), LLTO (lithium-lanthanum-titanium-oxide or lithium-lanthanum-titanate), an ion-exchange polymer such as sulfonated tetrafluoroethylene, a mixed conductor, such as $TiS_2$, and any other suitable low counter-ion permeability material having a greater permeability to the active ions than to the passive ions. In some embodiments, the thin film layer 208 is formed by sintering powder particles of the film, and then placing the sintered particles on the surface of the positive electrode 204. Contact and adhesion between the thin film layer 208 and the positive electrode 204 may be improved by using pressure and/or elevated temperature. In some embodiments, the thickness of the film layer 208 is less than 500 microns, and in further embodiments the thickness of the film layer 208 is less than 20 microns, less than 5 microns, or less than 1 micron. In some embodiments the low counter-ion permeability layer may include both material(s) that conduct the working ion and material(s) that have low permeability to both the working ion and the counter ion. For example, the layer may consist of Li-conducting ceramic particles such as LATP embedded in an inert, nonconductive polymer, such that there exists a percolating network of the Li-conducting material between the separator and the positive electrode.

In embodiments in which the low counter-ion permeability layer 208 is deposited on the positive electrode 204, the low counter-ion permeability layer 208 may be formed of LiPON (lithium phosphorus oxynitride) or another suitable low counter-ion permeability material that can be deposited on the positive electrode 204. The material for the low counter-ion permeability layer 208 may be deposited on the positive electrode 204 by, for example, sputtering deposition, ALD (atomic layer deposition), PLD (pulsed layer deposition), solution or slurry coating, or another suitable deposition technique.

Next, the separator layer 212 is added to the low counter-ion permeability layer 208. In some embodiments, the thickness of the separator layer 212 is less than 500 microns, and in further embodiments the thickness of the separator layer 212 is less than 20 microns. In some embodiments, the separator layer 212 is formed of polyethylene oxide with a salt or with a solid polymer electrolyte. In embodiments with a solid polymer electrolyte, any suitable solid polymer electrolyte compatible with the desired battery type may be used. In some embodiments, the solid polymer electrolyte may also include one or more electrolyte salts that improve ionic conductivity. For example, in a lithium-ion battery, examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. The linear polymers may also be used in combination as graft copolymers with polysiloxanes, polyphosphazines, polyolefins, and/or polydienes to form the conductive phase. The structural phase may be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly (cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. In some embodiments, the structural phase is rigid and is in a glassy or crystalline state. Further information about such block copolymer electrolytes can be found in U.S. Pat. No. 9,136,562, issued Sep. 15, 2015, U.S. Pat. No. 8,889,301, issued Nov. 18, 2014, U.S. Pat. No. 8,563,168, issued Oct. 22, 2013, and U.S. Pat. No. 8,268,197, issued Sep. 18, 2012, the contents of all of which are incorporated herein by reference in their entirety.

Finally, after completion of the separator layer 212, the negative electrode 216 is added. In one embodiment, the negative electrode 216 is a porous negative electrode, while in other embodiments the negative electrode 216 is a metal foil. In embodiments in which the negative electrode 216 is a porous negative electrode, the negative electrode material may be coated using conventional battery coating techniques. The negative electrode 216 comprises an active material, an electrically conductive material, and, in some embodiments, a binder material. In various embodiments, the active material of the negative electrode 216 may be graphite, LTO (lithium titanate), silicon, silicon oxide, or another suitable negative electrode active material. The electrically conductive material may be carbon black or another suitable electrically conductive material. The binder may be PVDF or another suitable binder material.

Similarly to the positive electrode 204, solid ionically conductive material may be present in the negative electrode 216 prior to the battery assembly, or liquid ionically conductive material may be added in a subsequent step. The solid ionically conductive material may be, for example, polyethylene oxide with salt. The liquid ionically conductive material may be, for example, a mixture of carbonates with salt.

In embodiments in which the negative electrode 216 is a metal foil, the foil is applied to the surface of the separator 212. The foil may be, for example, lithium, sodium, potassium, magnesium, zinc, or another suitable negative electrode material.

In embodiments in which the battery includes a liquid electrolyte, the liquid electrolyte is added after the negative electrode 216 is completed. Finally, the battery is completed by adding current collectors and the housing.

While the production of the electrode configuration 200 is described above with the positive electrode 204, low counter-ion permeability layer 208, separator 212, and negative electrode 216 produced in that order, the reader should appreciate that the electrode configuration 200 may be formed in any suitable order, for example beginning with the negative electrode 216 and ending with the positive electrode 204, or with various parts of the battery being formed concurrently or as sub-assemblies.

In the battery 100 according to the disclosure, contrary to conventional batteries, the electrode configuration 200 includes the layer 208 that has low permeability to counter-ions, which are the ions that do not participate in the electrode reactions. For example, one salt that may be used in a lithium-ion battery is $LiPF_6$ (lithium hexafluorophosphate). The lithium ions, $Li^{3o}$, react at the electrodes during operation of the battery. The $PF_6^-$ ions do not react at the electrodes and are considered the counter-ions. As used herein, "low permeability to counter-ions" is defined to mean that the low counter-ion permeability layer 208 has a lower permeability to the counter-ions as compared to the permeability of the ions involved in the electrode reactions.

The lithium ions flow through the separator 212, from the negative electrode 216 to the positive electrode 204 during discharge of the battery. In a conventional battery, the counter-ions tend to flow in the opposite direction, from the positive electrode to the negative electrode during discharge. This causes the concentration of ions to be large near the negative electrode, and low near the positive electrode, which, as discussed above, can cause reduced charge and discharge capacity and speed of the battery, in addition to potentially undesirable reactions in the battery. The low counter-ion permeability layer 208 impedes the movement of the counter-ions from the positive electrode 204 to the negative electrode 216 during discharge of the battery 100. As a result, the concentration of the ions near the negative electrode and positive electrode remains closer to the steady-state concentration. Accordingly, the negative concentration polarization effects are reduced in the battery 100.

Figure 4A:
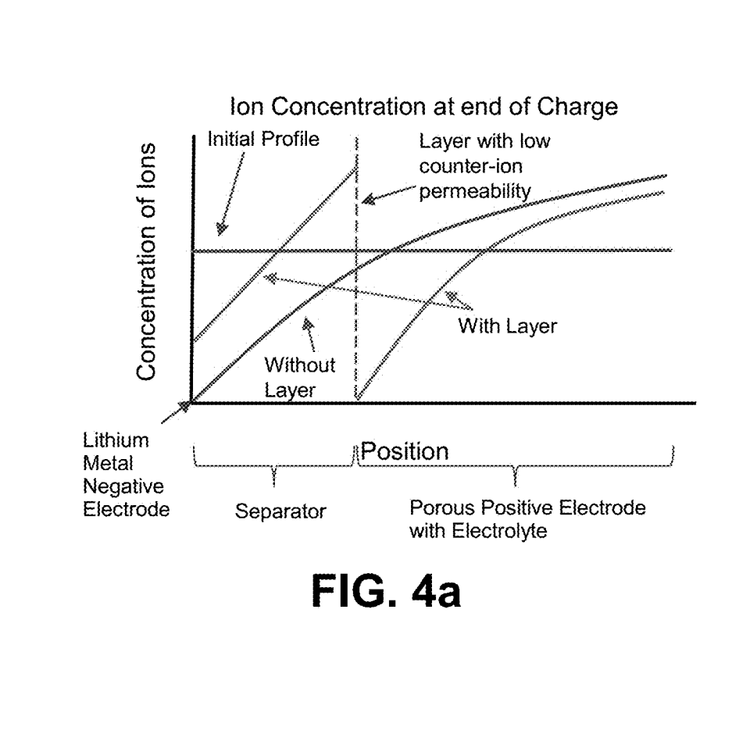
FIG. 4a is a graph comparing the ion concentration against distance from the negative electrode for the battery cell of FIG. 2 compared to a conventional battery cell.
Figure 4B:
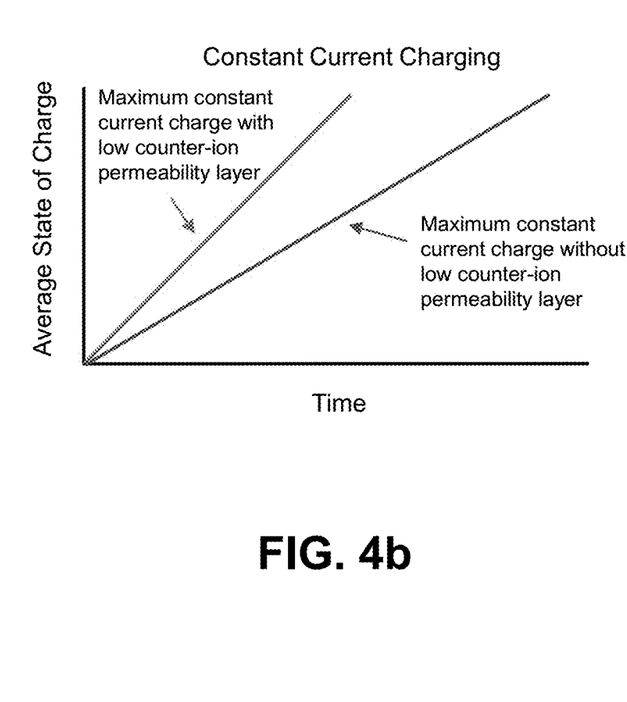
FIG. 4b is a graph comparing the charge against time for the battery cell of FIG. 2 compared to a conventional battery cell during constant current charging.

The low counter-ion permeability layer 208 performs essentially the same function in reverse in the electrode configuration 200 during charging of the battery. As such, as illustrated in FIG. 4a, the ion concentration near the negative electrode is greater in the battery 100 having the electrode configuration 200 compared to a conventional battery. This reduction in concentration polarization provides improved charging speed and capacity, as illustrated in FIG. 4b, which shows the comparison between charge rate of the battery 100 having the electrode configuration 200 and the charge rate of a battery having a conventional electrode configuration.

In one embodiment, the low counter-ion permeability layer 208 enables the electrode configuration 200 to include different counter-ions adjacent to the positive electrode 204 than adjacent to the negative electrode 216. In particular, the low counter-ion permeability layer 208 may inhibit the movement of the ions and the salt between the positive and negative electrodes 204, 216. For example, in one embodiment, $LiBF_4$ (lithium tetrafluoroborate) is the salt used to provide the counter-ions adjacent to or in the positive electrode 204, while LiTFSI (lithium bis(trifluoromethanesulfonyl)imide) is the salt used to provide the counter-ions adjacent to or in the negative electrode 204. The low counter-ion permeability layer 208 impedes the movement of the counter-ions and the salts between the positive electrode 204 and the negative electrode 216, which enables the different ions to be used at the respective electrode without becoming mixed in the battery. Using different counter-ions at the positive electrode 204 and the negative electrode 216 provides greater voltage stability, reduces production cost, and/or enable greater current densities than the use of a single salt throughout a battery since the battery can be designed for less disadvantageous reactions at the negative electrode and positive electrode as compared to the conventional battery.

In addition, the low counter-ion permeability layer 208 of the present disclosure enables the battery 100 to have different solvents near the positive electrode than those near the negative electrode, provided that it is also a low permeability layer for the solvents. For instance, in one embodiment, the solvent polyethylene oxide (or a block copolymer containing polyethylene oxide) in used as an electrolyte in the separator 212, while acetonitrile is used as the electrolyte in the positive electrode 204. This combination advantageously enables a higher voltage positive electrode active material, for example NCA, to be used due to the high voltage stability of acetonitrile, increasing energy density, while also allowing a low voltage stable mechanically robust separator 212.

In another embodiment, the low counter-ion permeability layer 208 also inhibits the mixing of salts adjacent to the negative electrode 216 and the salts adjacent to the positive electrode 204. As a result, the battery 100 may have different concentrations of salt in the negative electrode 216 or in the separator 212 adjacent to the negative electrode 216 than in the positive electrode 204 or in the separator 212 adjacent to the positive electrode 204. In one particular embodiment, the concentration of salt in or adjacent to the negative electrode 216 is greater than the concentration of salt in or adjacent to the positive electrode 204.

The use of different salt concentrations enables the battery 100 to have greater charging rate capability, and also decreases aging of the battery 100. The range of concentrations in or adjacent to the negative electrode may be between 10% and 99% by mass, while the range of concentrations in or adjacent to the positive electrode may be between 10% and 99% by mass. In one particular embodiment, the salt concentration in or adjacent to the negative electrode may differ from the salt concentration in or adjacent to the positive electrode by at least 5% by mass. In another embodiment, the salt concentration in or adjacent to the negative electrode may differ from the salt concentration in or adjacent to the positive electrode by at least 10% by mass, by at least 25% by mass, or by at least 50% by mass. In various embodiments, the difference between the salt concentration in or adjacent to the negative electrode and the salt concentration in or adjacent to the positive electrode may between 1% and 90%, or any value within the range between 1% and 90%.

Furthermore, in some embodiments, the addition of the low counter-ion permeability layer 208 enables the use of different additives near the negative electrode 216 and near the positive electrode 204. Such additives may improve interfacial stability between materials in the electrode configuration 200. For example, vinylene carbonate may be used against the negative electrode 216 in some embodiments.

In another embodiment, a lithium-ion battery cell is assembled with minimal or no lithium in the negative electrode 216. For example, the cell may be assembled with a copper current collector facing the separator 212, and optionally with an adlayer on the surface of the copper current collector. In a different embodiment, the cell may have a copper current collector with a thin layer of lithium deposited onto the copper, for example by thermal evaporation. In any of these cases, the majority of the lithium cycled back and forth between the electrodes will be initially stored in the positive electrode active material when the cell is assembled.

Figure 3:
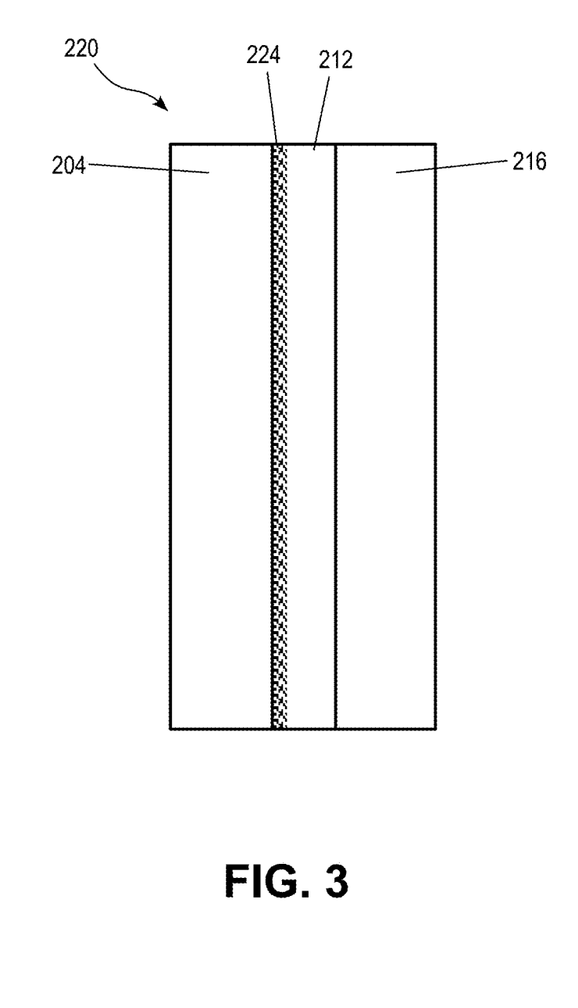
FIG. 3 is a schematic view of a battery cell of the battery pack of FIG. 1.

In another embodiment, illustrated in FIG. 3, an electrode configuration 220 according to the disclosure includes a low counter-ion permeability layer that is formed by particles or flakes 224 of low counter-ion permeability embedded in the separator 212 or the same material as is present in the separator, or in the positive electrode 204 or the same material as is present in the positive electrode 204. In one embodiment, the thickness of the layer of particles 224 is less than 20 µm, in another embodiment the thickness is less than 2 µm, and in a further embodiment the thickness of the layer of particles 224 is less than 1 µm. The dimensions of the particles themselves are less than the thickness of the layer 224.

In other embodiments, the low counter-ion permeability layer 208 includes pinholes or cracks within the layer 208.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. An electrode configuration for a battery cell, comprising:
    a positive electrode;
    a negative electrode;
    a separator interposed between the positive electrode and the negative electrode, the separator having a first permeability to counter-ions, which do not participate in the battery electrode reactions; and
    a low counter-ion permeability layer interposed between the separator and the positive electrode, the low counter-ion permeability layer having a second permeability to the counter-ions that is less than the first permeability,
    wherein the separator includes a first salt concentration adjacent to the low counter-ion permeability layer and a second salt concentration adjacent to the negative electrode, and the second salt concentration is greater than the first salt concentration.

2. The electrode configuration of claim 1, wherein the low counter-ion permeability layer includes a film applied to the positive electrode.

3. The electrode configuration of claim 2, wherein the film includes one or more of: LATP; LLZO; LLTO; an ion-exchange polymer; sulfonated tetrafluoroethylene; a mixed conductor; and $TiS_2$.

4. The electrode configuration of claim 1, wherein the low counter-ion permeability layer includes LATP embedded in an inert, nonconductive polymer in such a way that the low counter-ion permeability layer forms a percolating network of the lithium conducting material between the separator and the positive electrode.

5. The electrode configuration of claim 1, wherein the low counter-ion permeability layer is formed of LiPON deposited on the positive electrode.

6. The electrode configuration of claim 1, wherein the counter-ions include first counter-ions adjacent to the positive electrode and second counter-ions adjacent to the negative electrode, the first counter-ions being different from the second counter-ions.

7. The electrode configuration of claim 6, wherein the first counter-ions are provided by $LiBF_4$ and the second counter-ions are provided by LiTFSI.

8. The electrode configuration of claim 1, wherein the positive electrode comprises a first solvent, and the separator comprises a second solvent, the first solvent being different from the second solvent, and the low counter-ion permeability layer has low permeability to the first and second solvents such that the first and second solvents are separated by the low counter-ion permeability layer.

9. The electrode configuration of claim 8, wherein:
    the first solvent includes acetonitrile and the second solvent includes polyethylene oxide, and
    the positive electrode further comprises a positive electrode active material including NCA.

10. The electrode configuration of claim 1, further comprising:
    a vinylene carbonate additive adjacent to the negative electrode.

11. The electrode configuration of claim 1, wherein:
    the low counter-ion permeability layer includes a plurality of particles or flakes embedded in a material that is the same as material from which one of the separator and the positive electrode is formed.

12. The electrode configuration of claim 1, wherein the low counter-ion permeability layer has a thickness of less than 500 microns.

13. The electrode configuration of claim 1, wherein the separator is formed of polyethylene oxide with a salt or with a solid polymer electrolyte.

14. The electrode configuration of claim 1, wherein the positive electrode includes a first solid ionically conductive material and the negative electrolyte includes a second solid ionically conductive material.

15. A battery cell comprising:
    an electrode configuration comprising:
        a positive electrode;
        a negative electrode;
        a separator interposed between the positive electrode and the negative electrode, the separator having a first permeability to counter-ions, which do not participate in the battery electrode reactions; and
    a low counter-ion permeability layer interposed between the separator and the positive electrode, the low counter-ion permeability layer having a second permeability to the counter-ions that is less than the first permeability,
    wherein the separator includes a first salt concentration adjacent to the low counter-ion permeability layer and a second salt concentration adjacent to the negative electrode, and the second salt concentration is greater than the first salt concentration.

16. An electrode configuration for a battery cell, comprising:
    a positive electrode;
    a negative electrode;

a separator interposed between the positive electrode and the negative electrode, the separator having a first permeability to counter-ions, which do not participate in the battery electrode reactions; and a low counter-ion permeability layer interposed between the separator and the positive electrode, the low counter-ion permeability layer having a second permeability to the counter-ions that is less than the first permeability, wherein the counter-ions include first counter-ions adjacent to the positive electrode and second counter-ions adjacent to the negative electrode, the first counter-ions being different from the second counter-ions.

17. The electrode configuration of claim 16, wherein the first counter-ions are provided by $LiBF_4$ and the second counter-ions are provided by LiTFSI.

18. The electrode configuration of claim 17, wherein a first concentration of the $LiBF_4$ adjacent to the positive electrode is less than a second concentration of the LiTFSI adjacent to the negative electrode.

* * * * *